United States Patent
Vaishanavy Krishnaswamy Ravindran et al.

(10) Patent No.: US 12,314,439 B2
(45) Date of Patent: *May 27, 2025

(54) ELECTRONIC SYSTEM FOR PREDICTING, DETECTING, AND PREVENTING UNAUTHORIZED ACCESS EVENTS ASSOCIATED WITH ELECTRONIC SYSTEMS

(71) Applicant: BANK OF AMERICA CORPORATION, Charlotte, NC (US)

(72) Inventors: Sree Krishna Vaishanavy Krishnaswamy Ravindran, Chennai (IN); Sneha Padiyar, Andheri East (IN); Ravikiran Subramanya Rao, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,739

(22) Filed: Mar. 10, 2024

(65) Prior Publication Data
US 2024/0211631 A1 Jun. 27, 2024

Related U.S. Application Data

(63) Continuation of application No. 17/482,529, filed on Sep. 23, 2021, now Pat. No. 11,983,293.

(51) Int. Cl.
G06F 21/62 (2013.01)
G06Q 20/10 (2012.01)

(52) U.S. Cl.
CPC ..... *G06F 21/6245* (2013.01); *G06Q 20/1085* (2013.01)

(58) Field of Classification Search
CPC ................ G06F 21/6245; G06Q 20/1085
See application file for complete search history.

(56) References Cited

U.S. PATENT DOCUMENTS

| | | | |
|---|---|---|---|
| 6,658,393 B1 | 12/2003 | Basch et al. | |
| 7,183,915 B2 | 2/2007 | Bartholf et al. | |
| 7,946,480 B2 | 5/2011 | Miller et al. | |
| 7,992,777 B1 | 8/2011 | Block et al. | |
| 8,412,605 B2 | 4/2013 | Griffin et al. | |
| 11,983,293 B2 * | 5/2024 | Ravindran | ............ G07F 19/207 |

(Continued)

*Primary Examiner* — Matthew T Henning
(74) *Attorney, Agent, or Firm* — Moore & Van Allen PLLC; Lauren M. Stokes

(57) ABSTRACT

Systems, computer program products, and methods is provided for preventing unauthorized access events in electronic systems. The systems, computer program products, and methods may be configured to receive, from a first automated teller machine, an alert message including information associated with a first unauthorized access event occurring at the first automated teller machine and determine, based on the information in the alert message, a location of the first automated teller machine. The systems, computer program products, and methods may be configured to identify a second automated teller machine proximate the location of the first automated teller machine and provide, to the second automated teller machine, one or more commands to be executed by the second automated teller machine to prevent a second unauthorized access event from occurring at the second automated teller machine.

20 Claims, 10 Drawing Sheets

(56) References Cited

U.S. PATENT DOCUMENTS

| | | |
|---|---|---|
| 2004/0168067 A1 | 8/2004 | Russikoff |
| 2008/0103972 A1 | 5/2008 | Lanc |
| 2008/0140576 A1 | 6/2008 | Lewis et al. |
| 2008/0319922 A1 | 12/2008 | Lawrence et al. |
| 2009/0106846 A1 | 4/2009 | Dupray et al. |
| 2009/0201372 A1 | 8/2009 | O'Doherty et al. |
| 2009/0248560 A1 | 10/2009 | Recce et al. |
| 2009/0248573 A1 | 10/2009 | Haggerty et al. |
| 2010/0059587 A1 | 3/2010 | Miller et al. |
| 2011/0066547 A1 | 3/2011 | Clark et al. |
| 2012/0038775 A1 | 2/2012 | Priesterjahn et al. |
| 2019/0197369 A1 | 6/2019 | Law et al. |
| 2021/0192523 A1 | 6/2021 | Pham et al. |

\* cited by examiner

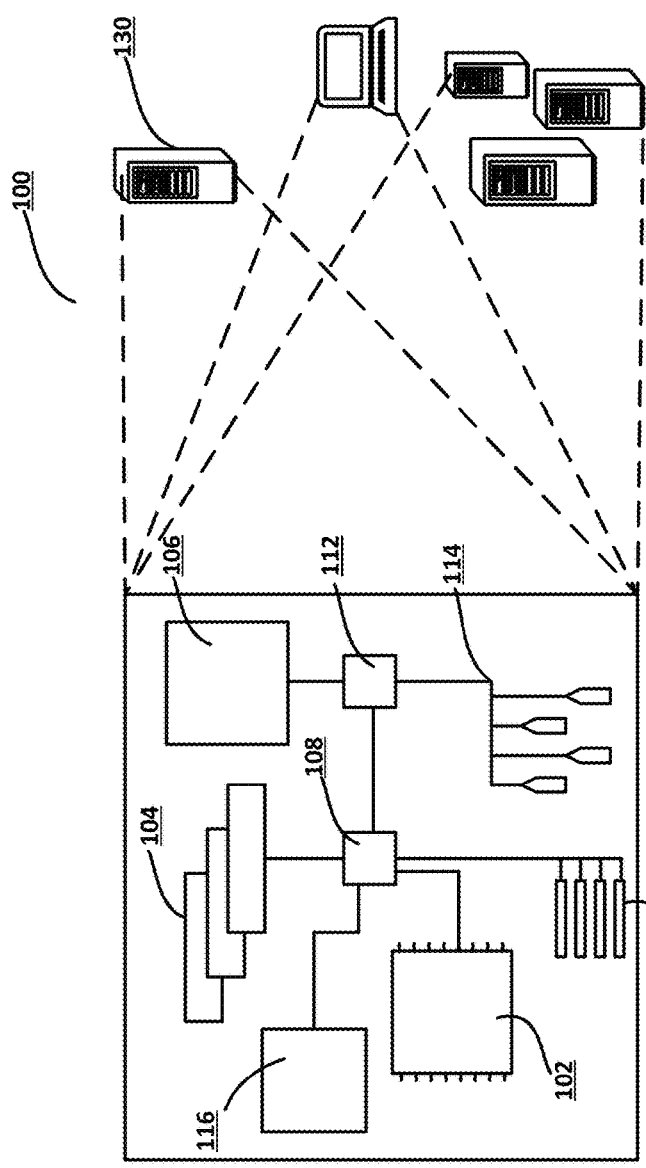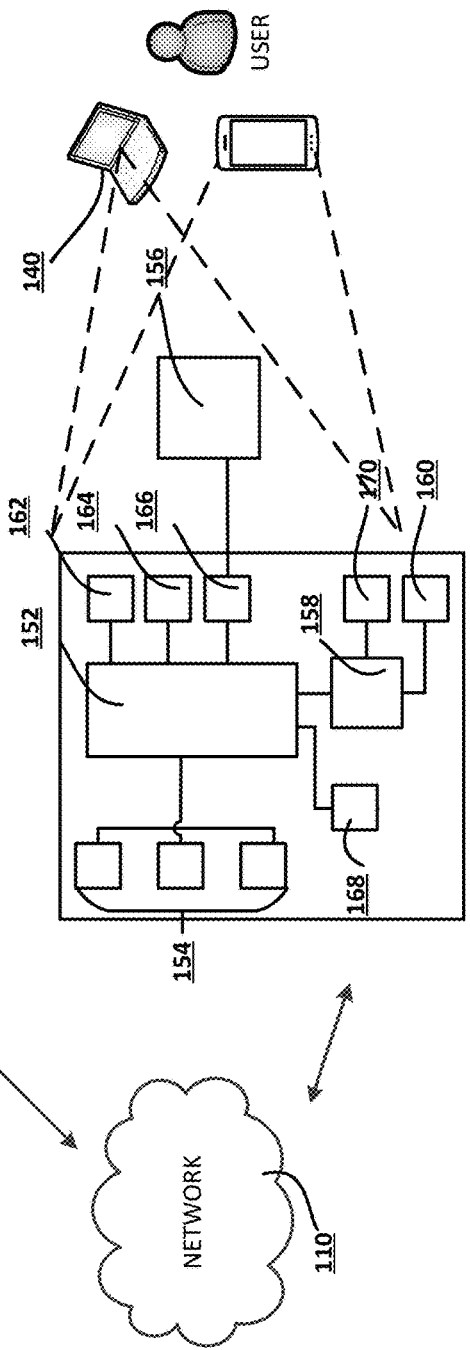
FIGURE 1

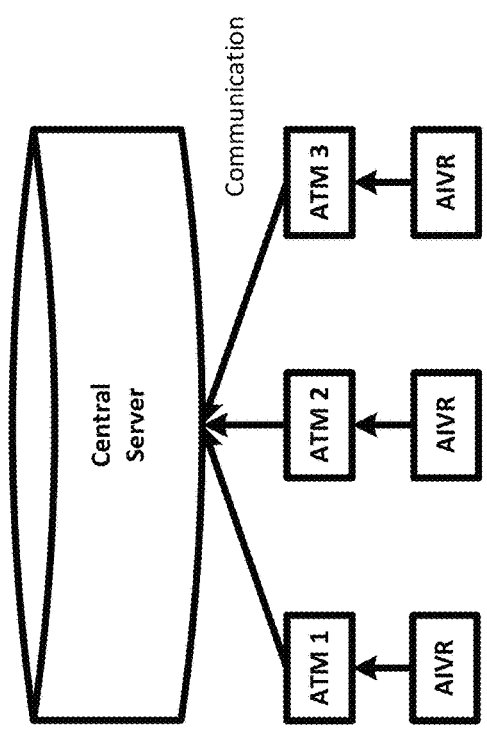
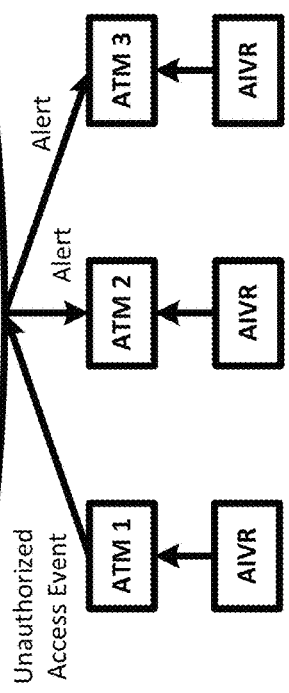

ELECTRONIC SYSTEM FOR PREDICTING, DETECTING, AND PREVENTING UNAUTHORIZED ACCESS EVENTS ASSOCIATED WITH ELECTRONIC SYSTEMS

CROSS-REFERENCE TO RELATED APPLICATIONS

This application is a continuation of and claims priority to U.S. patent application Ser. No. 17/482,529 filed on Sep. 23, 2021 and of the same title; the contents of which are also hereby incorporated by reference.

FIELD OF THE INVENTION

The present invention embraces an electronic system for predicting, detecting, and preventing unauthorized access events associated with electronic systems.

BACKGROUND

An electronic system may be configured to provide access to a user based on the user entering authentication credentials. In response to the user providing valid authentication credentials, the electronic system may permit the user to access information, utilize functions, and/or the like of the electronic system.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for predicting, detecting, and preventing unauthorized access events associated with electronic systems. The system may include at least one non-transitory storage device and at least one processing device coupled to the at least one non-transitory storage device, where the at least one processing device may be configured to receive, from a first automated teller machine, an alert message including information associated with a first unauthorized access event occurring at the first automated teller machine and determine, based on the information in the alert message, a location of the first automated teller machine. The at least one processing device may be configured to identify a second automated teller machine proximate the location of the first automated teller machine and provide, to the second automated teller machine, one or more commands to be executed by the second automated teller machine to prevent a second unauthorized access event from occurring at the second automated teller machine.

In some embodiments, the first automated teller machine may be configured to provide the alert message via a wireless network, the at least one processing device may be configured to receive the alert message from the first automated teller machine via the wireless network and provide the one or more commands to the second automated teller machine via the wireless network, and the second automated teller machine may be configured to receive the one or more commands via the wireless network. Additionally, or alternatively, the wireless network may be a 5G cellular network.

In some embodiments, the location may be a first location, and the at least one processing device may be configured to receive, from a Global Positioning System (GPS) receiver module of the first automated teller machine, location-identifying information and determine, based on the location-identifying information, whether the first automated teller machine was removed from the first location. Additionally, or alternatively, the at least one processing device may be configured to, based on determining that the first automated teller machine was removed from the first location, provide the location-identifying information to a law enforcement system, determine, based on the location-identifying information, an expected route of the first automated teller machine, identify other automated teller machines proximate the expected route, and provide, to the other automated teller machines, additional commands to be executed by the other automated teller machines to prevent additional unauthorized access events from occurring at the other automated teller machines.

In some embodiments, the first automated teller machine may be associated with a first financial institution, and the second automated teller machine may be associated with a second financial institution.

In some embodiments, the one or more commands may include a command to shut a door, a command to disable a currency dispenser, a command to disable the second automated teller machine, a command to capture images with image capturing devices of the second automated teller machine, and/or the like.

In some embodiments, the first automated teller machine may include an image capturing device for capturing images of objects proximate the first automated teller machine and another processing device, where the other processing device may be configured to analyze, using a machine learning model, the images captured by the image capturing device to determine whether the first unauthorized access event is occurring and provide, based on determining that the first unauthorized access event is occurring, the alert message. Additionally, or alternatively, the other processing device may be configured to, when analyzing the images captured by the image capturing device, analyze, using the machine learning model, the images captured by the image capturing device to determine whether behavior of a user proximate the first automated teller machine is associated with unauthorized access events. In some embodiments, the machine learning model may be trained using historical image data associated with unauthorized access events and historical image data associated with authorized access events. Additionally, or alternatively, the first automated teller machine may include multiple image capturing devices for capturing images of the objects proximate the first automated teller machine, where the other processing device is configured to analyze, using the machine learning model, the images captured by the multiple image capturing devices to determine whether the first unauthorized access event is occurring. In some embodiments, the machine learning model may include a convolutional neural network and a recurrent neural network.

In some embodiments, the first automated teller machine may include an image capturing device for capturing images of objects proximate the first automated teller machine and another processing device, where the other processing device may be configured to analyze, using a machine learning model, the images captured by the image capturing device to predict the first unauthorized access event and provide, based on predicting the first unauthorized access event, the alert message. Additionally, or alternatively, the machine learning model may include a convolutional neural network and a recurrent neural network, where the other processing device is configured to, when analyzing the images captured by the image capturing device to predict the first unauthorized access event, analyze, using the convolutional neural network and the recurrent neural network, the images captured by the image capturing device and determine, using at least one of a fast region-based convolutional neural network or a Kalman Filter, a predicted next action of a user proximate the first automated teller machine.

In some embodiments, the first automated teller machine may include another processing device, where the other processing device may be configured to identify a third automated teller machine proximate the location of the first automated teller machine and provide, to the third automated teller machine via a 5G cellular network, another alert message including the information associated with the first unauthorized access event. Additionally, or alternatively, the first automated teller machine may include an image capturing device for capturing images of objects proximate the first automated teller machine, where the other processing device is configured to, when providing the other alert message to the third automated teller machine, provide images captured, with the image capturing device, during a time period associated with the first unauthorized access event.

In some embodiments, the first automated teller machine and the second automated teller machine are connected to a 5G cellular network, where the 5G cellular network includes one or more nodes, where the first automated teller machine, the second automated teller machine, and the one or more nodes each include another processor configured to communicate information associated with unauthorized access events via the 5G cellular network, determine, based on the information associated with the unauthorized access events communicated via the 5G cellular network, expected routes of users associated with the unauthorized access events, determine, based on the information associated with the unauthorized access events communicated via the 5G cellular network, other automated teller machines associated with a likelihood of other unauthorized access events, and provide, to the other automated teller machines via the 5G cellular network, additional commands to be executed by the other automated teller machines to prevent additional unauthorized access events from occurring at the other automated teller machines.

In another aspect, the present invention embraces a computer program product for predicting, detecting, and preventing unauthorized access events associated with electronic systems. The computer program product may include a non-transitory computer-readable medium including code causing a first apparatus to receive, from a first automated teller machine, an alert message including information associated with a first unauthorized access event occurring at the first automated teller machine and determine, based on the information in the alert message, a location of the first automated teller machine. The computer program product may include a non-transitory computer-readable medium including code causing the first apparatus to identify a second automated teller machine proximate the location of the first automated teller machine and provide, to the second automated teller machine, one or more commands to be executed by the second automated teller machine to prevent a second unauthorized access event from occurring at the second automated teller machine.

In some embodiments, the first automated teller machine may be configured to provide the alert message via a wireless network, the non-transitory computer-readable medium may include code causing the first apparatus to receive the alert message from the first automated teller machine via the wireless network and provide the one or more commands to the second automated teller machine via the wireless network, and the second automated teller machine may be configured to receive the one or more commands via the wireless network.

In yet another aspect, a method for predicting, detecting, and preventing unauthorized access events associated with electronic systems is presented. The method may include receiving, from a first automated teller machine, an alert message including information associated with a first unauthorized access event occurring at the first automated teller machine and determining, based on the information in the alert message, a location of the first automated teller machine. The method may include identifying a second automated teller machine proximate the location of the first automated teller machine and providing, to the second automated teller machine, one or more commands to be executed by the second automated teller machine to prevent a second unauthorized access event from occurring at the second automated teller machine.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 2:
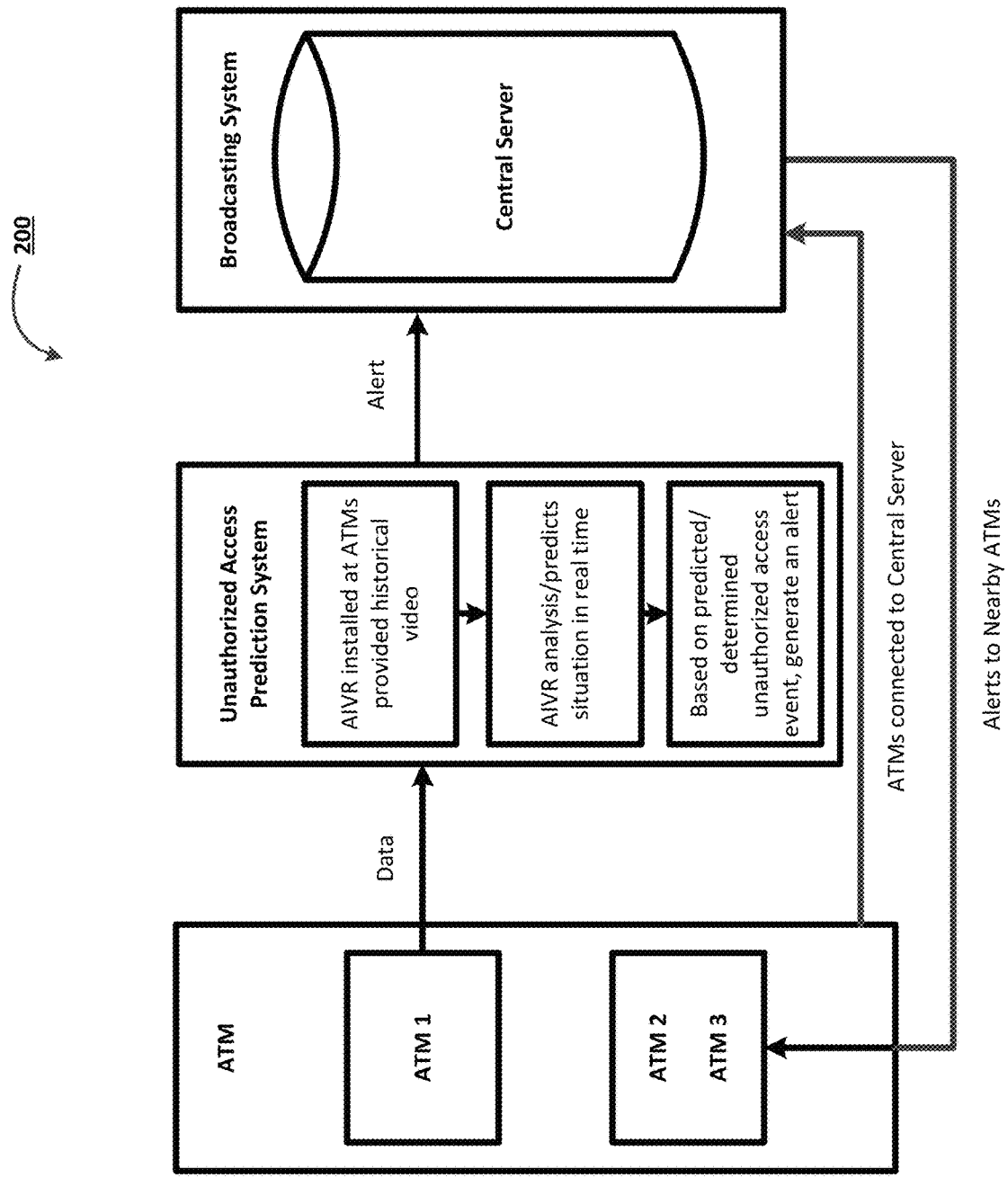
Figure 3:
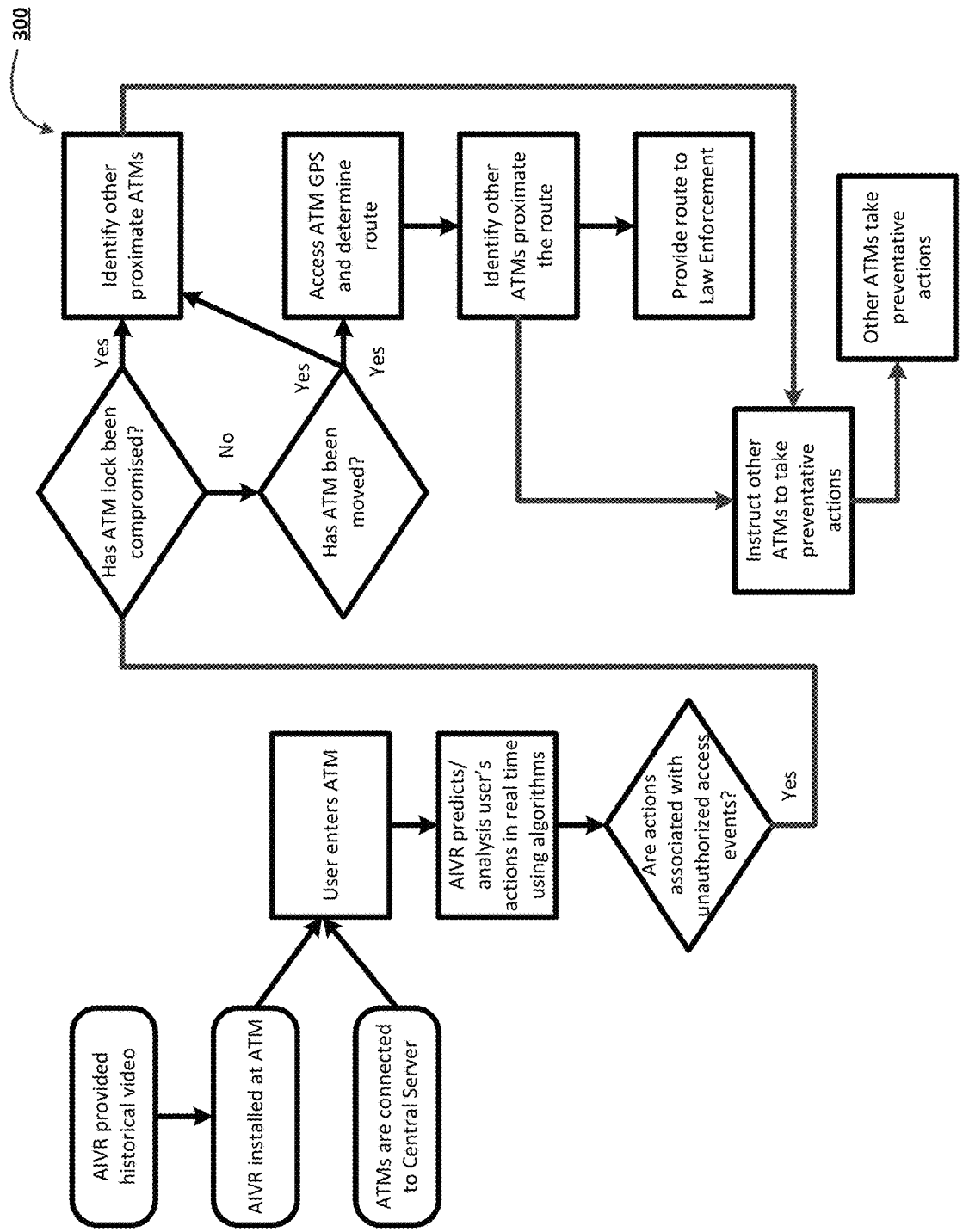
Figure 5:
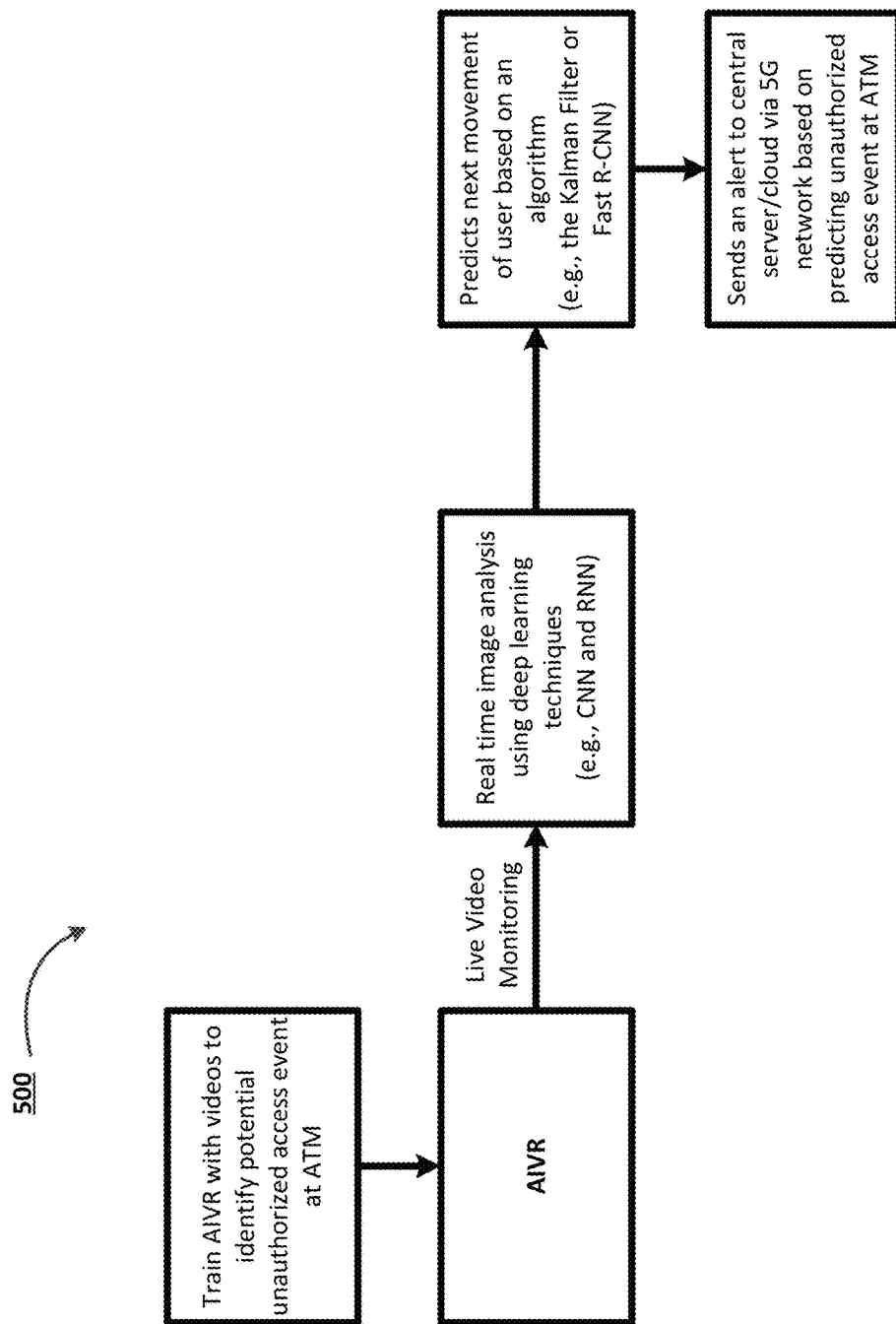
Figure 6:
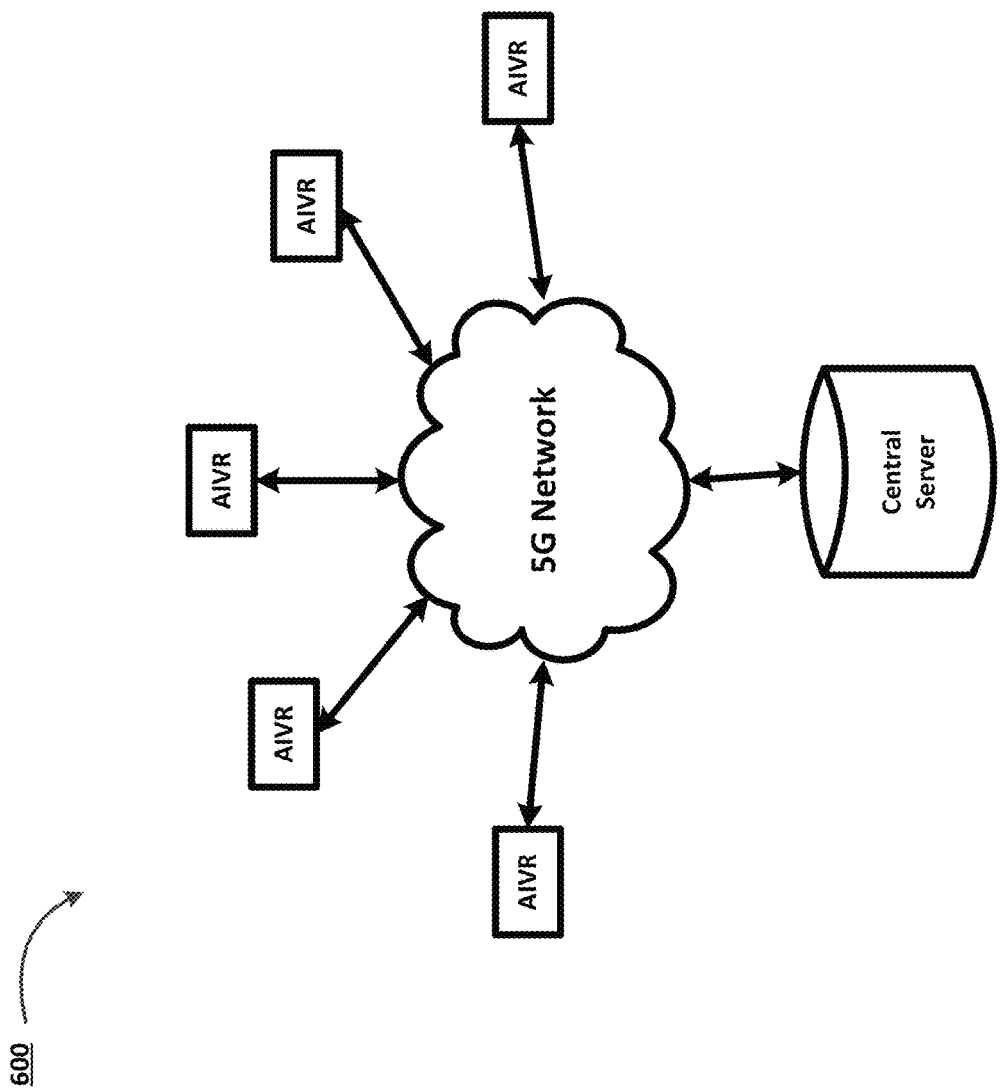
Figure 7:
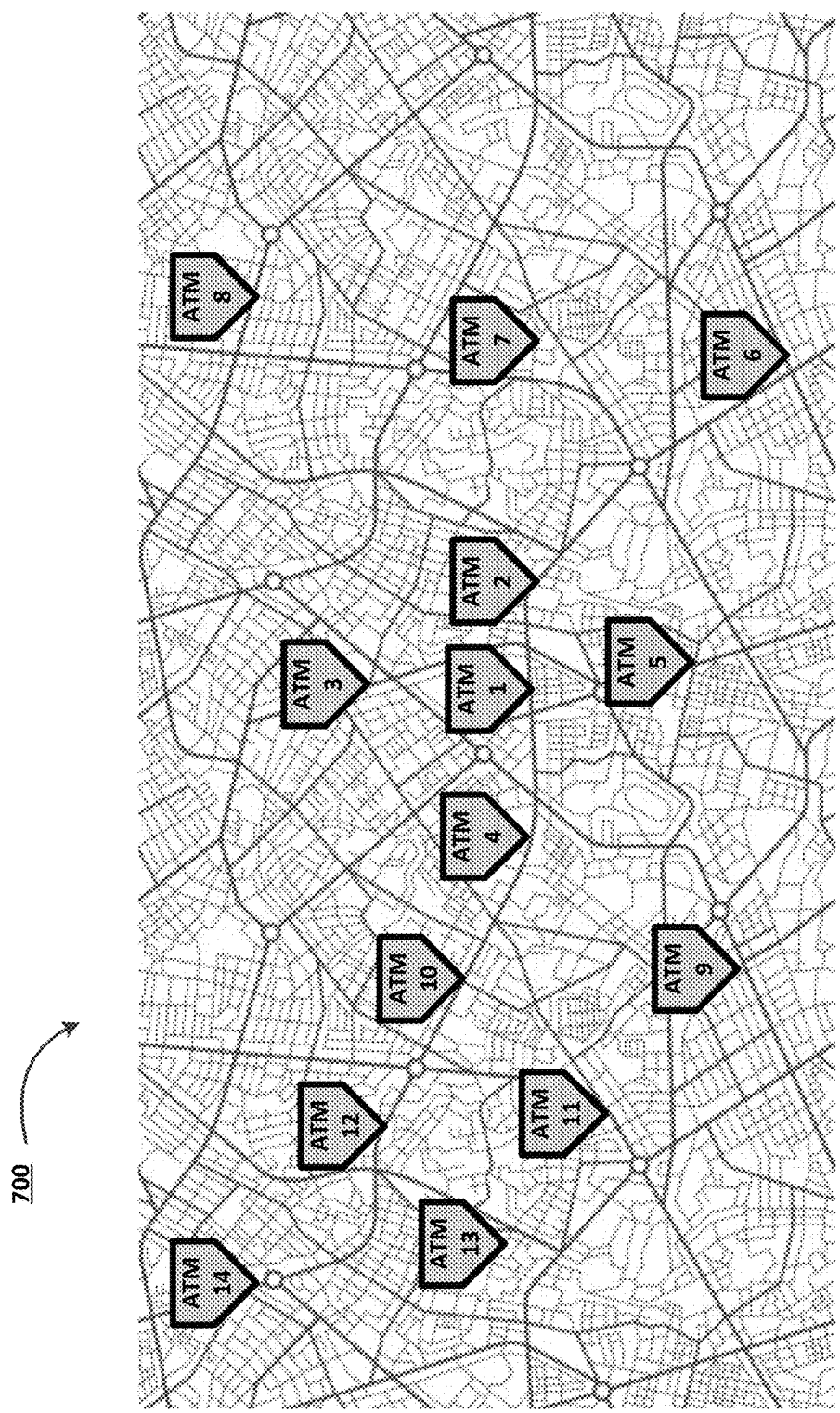
Figure 8:
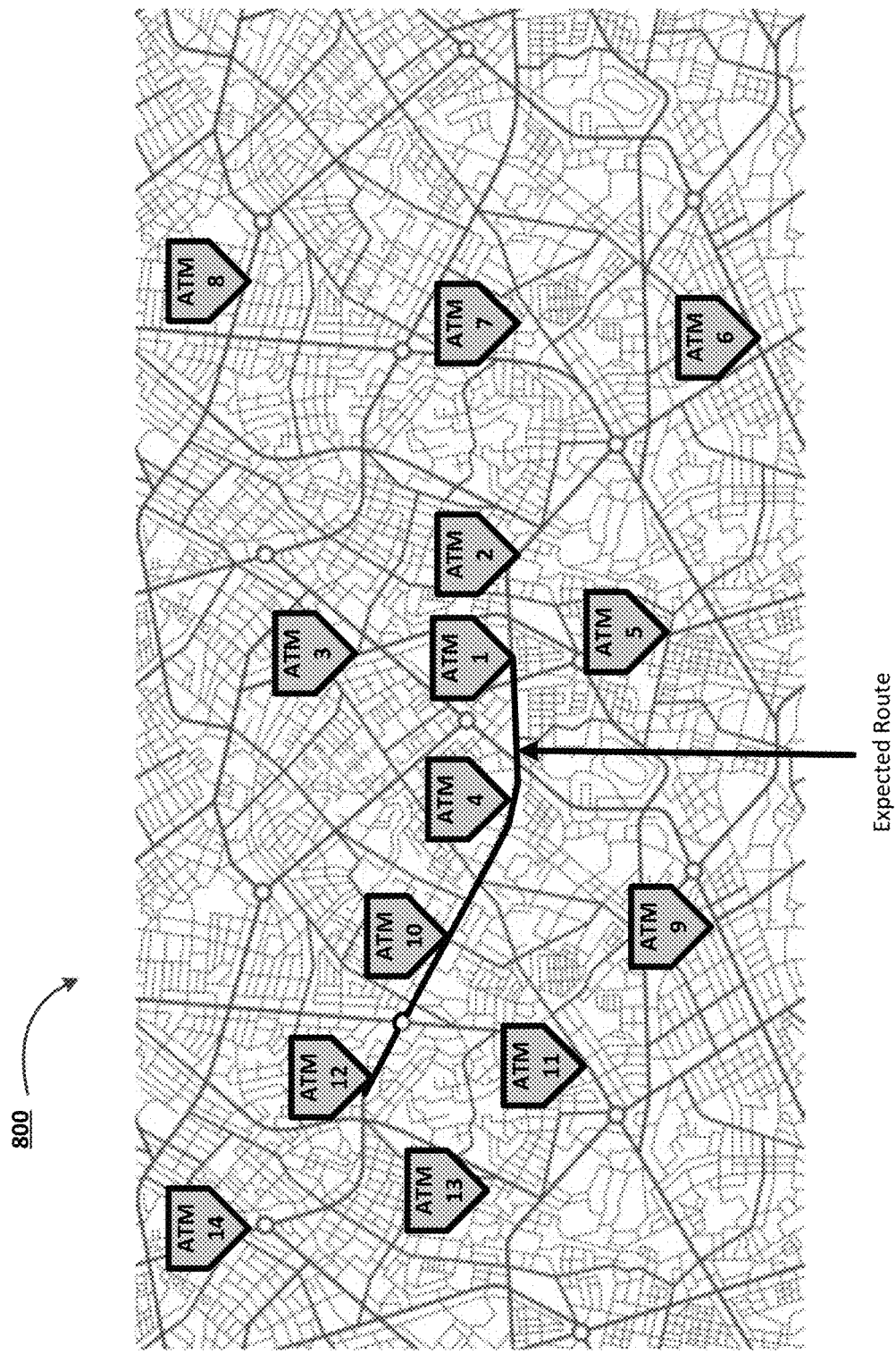
Figure 9:
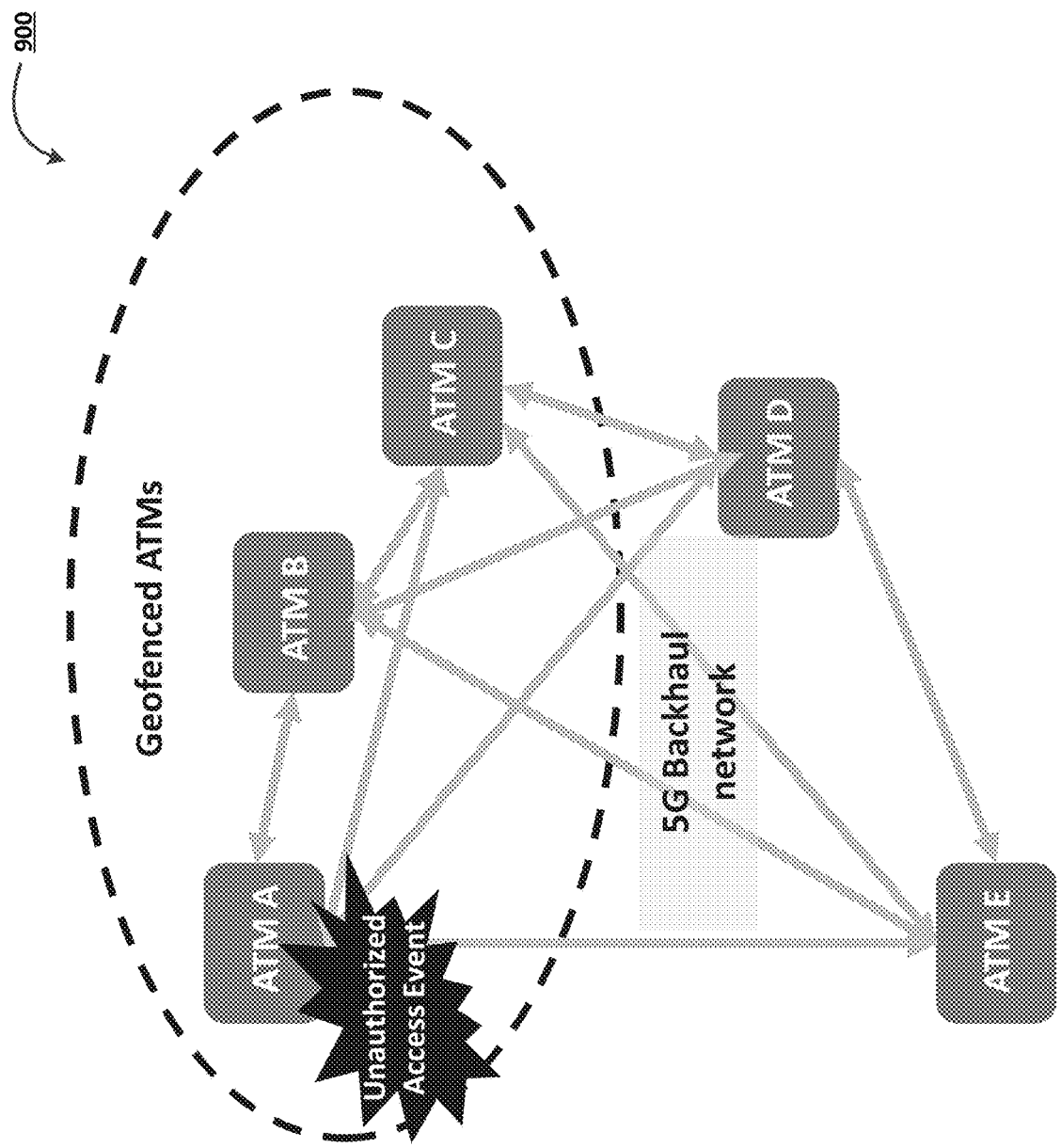
Figure 10:
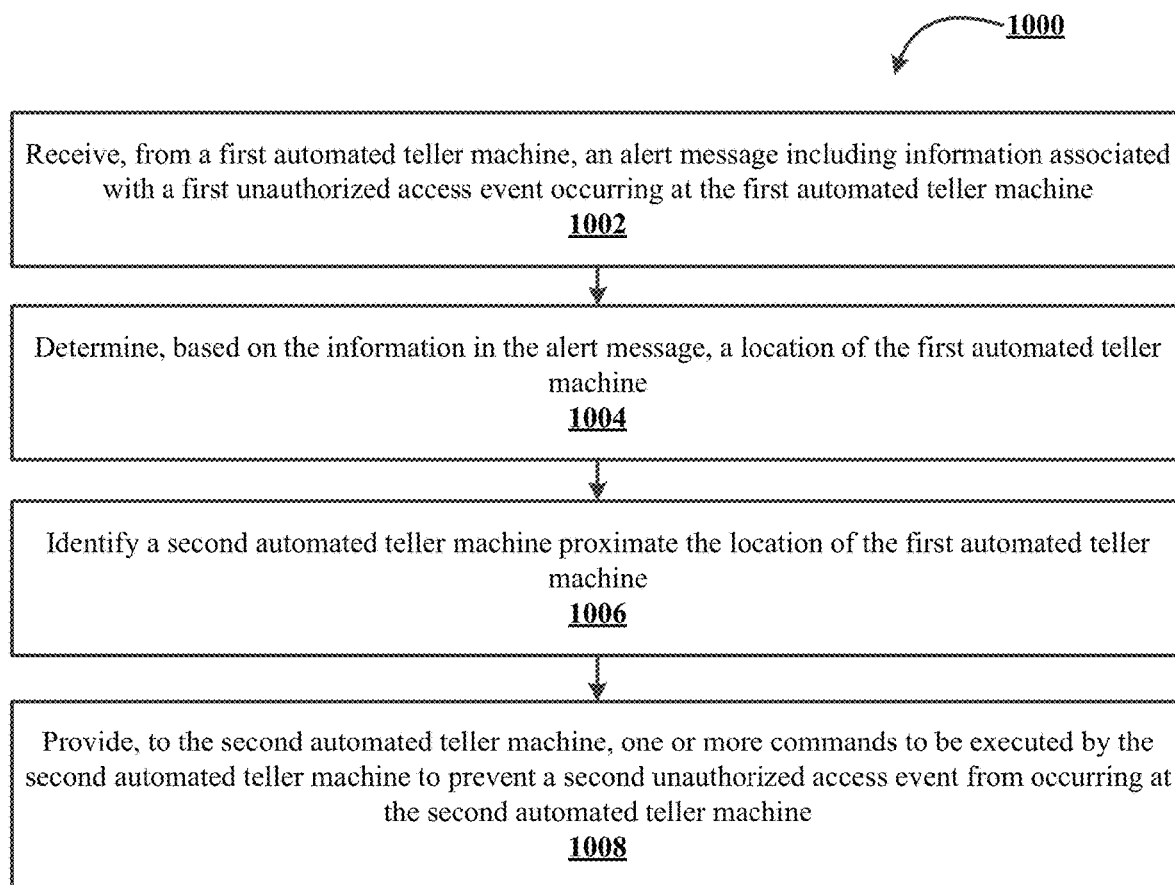

Having thus described embodiments of the invention in general terms, reference will now be made the accompanying drawings, wherein:

FIG. 1 illustrates technical components of a system for predicting, detecting, and preventing unauthorized access events associated with electronic systems, in accordance with an embodiment of the invention;

FIG. 2 illustrates a process flow for predicting, detecting, and preventing unauthorized access events associated with electronic systems, in accordance with an embodiment of the invention;

FIG. 3 illustrates a process flow for predicting, detecting, and preventing unauthorized access events associated with electronic systems, in accordance with an embodiment of the invention;

FIG. 4A illustrates a process flow for predicting, detecting, and preventing unauthorized access events associated with electronic systems, in accordance with an embodiment of the invention;

FIG. 4B illustrates a process flow for predicting, detecting, and preventing unauthorized access events associated with electronic systems, in accordance with an embodiment of the invention;

FIG. 5 illustrates a process flow for predicting, detecting, and preventing unauthorized access events associated with electronic systems, in accordance with an embodiment of the invention;

FIG. 6 illustrates a system environment for predicting, detecting, and preventing unauthorized access events associated with electronic systems, in accordance with an embodiment of the invention;

FIG. 7 illustrates a map associated with a system for predicting, detecting, and preventing unauthorized access events associated with electronic systems, in accordance with an embodiment of the invention;

FIG. 8 illustrates a map associated with a system for predicting, detecting, and preventing unauthorized access events associated with electronic systems, in accordance with an embodiment of the invention;

FIG. 9 illustrates a schematic diagram associated with a system for predicting, detecting, and preventing unauthorized access events associated with electronic systems, in accordance with an embodiment of the invention; and FIG. 10 illustrates a process flow for predicting, detecting, and preventing unauthorized access events associated with electronic systems, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to provide access to a user based on the user entering authentication credentials. In response to the user providing valid authentication credentials, the electronic system may permit the user to access information, utilize functions, and/or the like of the electronic system. However, some users that lack valid authentication credentials may attempt to access the electronic system using other methods (e.g., thereby causing an unauthorized access event). For example, the electronic system may include an automated teller machine, and a user and/or a group of users may attempt to access the automated teller machine to obtain resources within the automated teller machine (e.g., by damaging a lock and/or another component of the automated teller machine and/or the like). Additionally, or alternatively, the user and/or the group of users may physically remove the automated teller machine from the location at which the automated teller machine was installed. When a user and/or a group of users attempts to access one automated teller machine, the user and/or the group of users typically attempts to access other automated teller machines in proximity to the first automated teller machine. Such unauthorized access events consume significant resources (e.g., financial resources, computing resources, network resources, and/or the like) associated with repairing, reconfiguring, restocking, and/or the like the automated teller machine and attempting to identify, locate, report, and/or the like the user and/or the group of users causing the unauthorized access event. Furthermore, when the user and/or the group of users attempts to access other automated teller machines in proximity to the first automated teller machine, such additional unauthorized access events further consume significant resources (e.g., financial resources, computing resources, network resources, and/or the like).

Some embodiments described herein provide a system, a computer program product, and/or a method for predicting, detecting, and preventing unauthorized access events associated with electronic systems. For example, a system (e.g., an electronic system for predicting, detecting, and preventing unauthorized access events associated with electronic systems and/or the like) may be configured to receive, from a first automated teller machine, an alert message including information associated with a first unauthorized access event occurring at the first automated teller machine and determine, based on the information in the alert message, a location of the first automated teller machine. The system may be configured to identify a second automated teller machine proximate the location of the first automated teller machine and provide, to the second automated teller machine, one or more commands to be executed by the second automated teller machine to prevent a second unauthorized access event from occurring at the second automated teller machine.

In some embodiments, the system may be configured to send an alert and/or provide commands to proximate automated teller machines irrespective of the financial institution that owns, operates, maintains and/or the like the proximate automated teller machines. For example, the commands may include commands to take preventive measures, such as turning off the automated teller machine, shutting a door providing access to the automated teller machine, alerting a financial institution associated with the automated teller machine, alerting a law enforcement system, activating monitoring systems, and/or the like.

In some embodiments, the automated teller machines (e.g., irrespective of the financial institution that owns, operates, maintains and/or the like the automated teller machines) may be connected to a central server. Additionally, or alternatively, the automated teller machines may be connected to the central server via a 5G cellular network. In some embodiments, the automated teller machines may use artificial-intelligence enabled and vision enabled robots (e.g., installed at the automated teller machines and/or the like) to identify unauthorized access events and immediately send an alert message to a central system.

Additionally, or alternatively, the automated teller machines may be connected to a 5G cellular network including one or more nodes, and the automated teller machines and the one or more nodes of the 5G cellular network may be configured to communicate information associated with unauthorized access events via the 5G cellular network, determine expected routes of users associated with the unauthorized access events, determine other automated teller machines associated with a likelihood of other unauthorized access events, provide to other automated teller machines via the 5G cellular network additional commands to be executed by the other automated teller machines to prevent additional unauthorized access events from occurring at the other automated teller machines, and/or the like.

By identifying and providing commands to proximate automated teller machines to prevent additional unauthorized access events, the system conserves resources (e.g., financial resources, computing resources, network resources, and/or the like) that would otherwise be consumed by such additional unauthorized access events, such as repairing, reconfiguring, restocking, and/or the like automated teller machines and attempting to identify, locate, report, and/or the like the user and/or the group of users causing the unauthorized access events. Furthermore, by using the artificial-intelligence enabled and vision enabled robots to identify actions of user associated with unauthorized access events, the system may predict and prevent unauthorized access events, thereby conserving resources (e.g., financial resources, computing resources, network resources, and/or the like) that would otherwise be consumed by such unauthorized access events.

In some embodiments, the system may be configured to, when an ATM is robbed or physically removed from its location (i.e., an unauthorized access event), identifies other ATMs near the targeted ATM and provides commands to the other ATMs to prevent them from being robbed, to collect evidence associated with the robbery, and/or the like. For example, the system may instruct the other ATMs to close doors to prevent access to the other ATMs, disable cash withdrawals, disable the ATMs, turn on cameras to record events in proximity to the ATMs, and/or the like. The system may include a central server connected to the ATMs, irrespective of the bank that operates the ATM, and the central server may facilitate wireless communication between the ATMs and law enforcement. Additionally, or alternatively, the ATMs may be connected to a 5G network and may communicate directly with each other when unauthorized access events occur. If the ATM is removed from its location, the central server and/or the ATMs may use the GPS in the removed ATM to determine a route of the ATM, provide the route to law enforcement, and alert ATMs along the route. The ATMs may include cameras and may use artificial intelligence to predict whether they are about to be attacked. For example, the artificial intelligence may be trained using videos and/or images of previous ATM robberies, and, as new videos and/or images of new robberies are collected, the artificial intelligence may be re-trained using the new videos and/or images.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for predicting, detecting, and preventing unauthorized access events associated with electronic systems within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for predicting, detecting, and preventing unauthorized access events associated with electronic systems, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage.

Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more automated teller machines, one or more unauthorized access prediction systems, one or more broadcasting systems, one or more central servers, one or more artificial-intelligence-enabled, vision-enabled robots, and/or one or more network nodes (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more automated teller machines, one or more unauthorized access prediction systems, one or more broadcasting systems, one or more central servers, one or more artificial-intelligence-enabled, vision-enabled robots, and/or one or more network nodes may perform one or more of the steps described herein with respect to the process flows described herein with respect to FIGS. 2, 3, 4A, 4B, and 5-10.

FIG. 2 illustrates a process flow 200 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 200.

As shown in FIG. 2, the process flow 200 may include multiple automated teller machines (ATMs), an unauthorized access prediction system, and a broadcasting system including a central server. In some embodiments, the ATMs may include one or more artificial-intelligence-enabled vision enabled robots (AIVRs) and/or may be connected to one or more AIVRs. As shown in FIG. 2, the process flow 200 may include connecting the ATMs to the central server via the broadcasting system. Although FIG. 2 only depicts three ATMs, the process flow 200 may include fewer than three ATMs or more than three ATMs (e.g., tens of ATMs, hundreds of ATMs, thousands of ATMs, and/or the like).

As also shown in FIG. 2, the process flow 200 may include providing, using the unauthorized access prediction system, historical video to the AIVRs installed at the ATMs. For example, the historical video may include video and/or images of users attempting to obtain unauthorized access to ATMs, and the AIVRs may analyze the historical video to train one or more machine learning models to predict unauthorized access events based on real-time video and/or images.

As shown in FIG. 2, the process flow 200 may include analyzing and/or predicting, using the AIVR, a situation in real time to predict and/or determine whether an unauthorized access event is going to occur and/or is occurring. For example, the AIVR may analyze real-time video and/or images of the ATM (e.g., the data from ATM 1 as shown in FIG. 2) to predict and/or determine whether an unauthorized access event is going to occur and/or is occurring.

As shown in FIG. 2, the process flow 200 may include generate, using the unauthorized access prediction system and/or the AIVR and based on predicting and/or determining that an unauthorized access event is going to occur and/or is occurring, an alert. For example, and as shown in FIG. 2, the unauthorized access prediction system and/or the AIVR may provide the alert to the broadcasting system and/or the central server.

As shown in FIG. 2, the process flow 200 may include the broadcasting system and/or the central server providing, based on the alert from the unauthorized access prediction system and/or the AIVR, alerts to ATM 2 and ATM 3 that are proximate ATM 1. For example, the process flow 200 may include identifying, based on receiving the alert regarding ATM 1, other ATMs proximate ATM 1 and providing alerts to the other ATMs. In some embodiments, the alerts provided to the other ATMs may include commands to take precautionary measures, such as disabling a door, disabling resource withdrawal, disabling the ATM, enabling all cameras associated with the ATM, and/or the like.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 300.

As shown in FIG. 3, the process flow 300 may include providing historical videos to AIVRs. For example, and as described with respect to FIG. 2, the historical videos may include video and/or images of users attempting to obtain unauthorized access to ATMs, and the AIVRs may analyze the historical video to train one or more machine learning models to predict unauthorized access events based on real-time video and/or images.

As shown in FIG. 3, the process flow 300 may include installed the AIVR at an ATM. For example, one or more AIVRs may be installed as part of the ATM, proximate the ATM, in a position to observe the ATM and/or users proximate the ATM, and/or the like. In some embodiments, the AIVRs may be communicatively connected to the ATM and may monitor input provided by a user to a user input system of the ATM.

As shown in FIG. 3, the process flow 300 may include connecting the ATMs to a central server. For example, the ATMs may be connected to the central server and/or to one or more other ATMs via a 5G cellular network, which may provide high transmission speeds, low latency, and high data volumes as compared to other networks.

As shown in FIG. 3, the process flow 300 may include a user entering an ATM and the AIVR predicting and/or analyzing the user's actions in real time using algorithms. For example, the AIVR may analyze real-time video and/or images of the ATM to predict and/or analyze the user's actions.

As shown in FIG. 3, the process flow 300 may include determining whether the user's actions are associated with unauthorized access events. For example, the AIVR may predict and/or determine, based on the user's actions, whether the user's actions are associated with unauthorized access events.

As shown in FIG. 3, the process flow 300 may include determining whether a lock on the ATM has been compromised. For example, the lock may prevent access to internal components of the ATM, such as a resource repository (e.g., a currency repository and/or the like), and the ATM and/or the AIVR may determine whether the lock on the ATM has been compromised (e.g., based on a signal generated by the ATM's lock, based on video and/or images, and/or the like).

As shown in FIG. 3, the process flow 300 may include identifying, based on determining that the lock on the ATM has been compromised, other proximate ATMs. For example, a central server, the ATM, other ATMs, one or more network nodes, and/or the like may determine a location of the ATM and identify other ATMs proximate the ATM at which the unauthorized access event has occurred.

As shown in FIG. 3, the process flow 300 may include instructing the other ATMs to take preventative actions and the other ATMs taking the preventative actions. For example, the process flow 300 may include instructing, via a 5G network, the other ATMs to take preventative actions, such as disabling a door, disabling resource withdrawal, disabling the ATM, enabling all cameras associated with the ATM, and/or the like.

As also shown in FIG. 3, the process flow 300 may include determining, based on determining that the ATM lock has not been compromised, whether the ATM has been moved. For example, the process flow 300 may include determining whether the ATM has been moved based on a signal from a GPS receive module in the ATM, based on videos and/or images captured by the ATM and/or AIVR, and/or the like.

As shown in FIG. 3, the process flow 300 may include identifying, based on determining that the ATM has been moved, other proximate ATMs, instructing the other ATMs to take preventative actions, and the other ATMs taking the preventative actions as previously described. Furthermore, the process flow 300 may include accessing the ATM GPS and determining a route of the ATM. For example, the process flow 300 may include monitoring a signal from a GPS receive module in the ATM and determining (e.g., using a machine learning model and/or the like) a route and/or an expected route of the ATM. As shown in FIG. 3, the process flow 300 may include providing the route a law enforcement system.

As shown in FIG. 3, the process flow 300 may include identifying other ATMs proximate the route (e.g., the determined route, the expected route, and/or the like). For example, a central server, the ATM, other ATMs, one or more network nodes, and/or the like may identify other ATMs proximate the route.

As shown in FIG. 3, the process flow 300 may include instructing the other ATMs proximate the route to take preventative actions, and the other ATMs taking the preventative actions as previously described. For example, a central server, the ATM, other ATMs, one or more network nodes, and/or the like may provide, via a 5G network, instructions to the other ATMs proximate the route.

Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIG. 4A illustrates a process flow 400 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 400.

As shown in FIG. 4A, the process flow 400 may include connecting one or more AIVRs to one or more ATMs. For example, and as shown in FIG. 4A, at least one AIVR may be communicatively connected to each of ATM 1, ATM 2, and ATM 3. Although FIG. 4A only depicts three ATMs, the process flow 400 may include fewer than three ATMs or more than three ATMs (e.g., tens of ATMs, hundreds of ATMs, thousands of ATMs, and/or the like).

As also shown in FIG. 4A, the process flow 400 may include connecting one or more ATMs to a central server. For example, the process flow 400 may include connecting, via a 5G network, each of ATM 1, ATM 2, and ATM 3 to the central server.

Process flow 400 may include additional embodiments, such as any single embodiment or any combination of embodiments described below and/or in connection with one or more other processes described elsewhere herein. Although FIG. 4A shows example blocks of process flow 400, in some embodiments, process flow 400 may include additional blocks, fewer blocks, different blocks, or differently arranged blocks than those depicted in FIG. 4A. Additionally, or alternatively, two or more of the blocks of process flow 400 may be performed in parallel.

FIG. 4B illustrates a process flow 450 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 450. Additionally, or alternatively, the process flow 450 may be performed after the process flow 400 is performed.

As shown in FIG. 4B, the process flow 450 may include transmitting, from ATM 1 and to the central server, an alert message including information associated with an unauthorized access event. For example, the AIVR and/or the ATM 1 may predict that an unauthorized access event will occur and/or determine that an unauthorized access event is occurring or has occurred and transmit the alert message to the central server.

As shown in FIG. 4B, the process flow 450 may include receiving, with the central server, the alert message from ATM 1. In some embodiments, the process flow 450 may include determining, with the central server and based on the alert message, a location of ATM 1. Additionally, or alternatively, the process flow 450 may include identifying, with the central server, other ATMs proximate the location of ATM 1. For example, the process flow 450 may include determining that ATM 2 and ATM 3 are proximate ATM 1.

As shown in FIG. 4B, the process flow 450 may include providing, to ATM 2 and ATM 3, an alert message. For example, the process flow 450 may include providing, based on determining that ATM 2 and ATM 3 are proximate ATM 1 and based on receiving the alert message from ATM 1, alert messages to ATM 2 and ATM 3. In some embodiments, the alert message may include one or more commands to be executed by ATM 2 and ATM 3 to prevent another unauthorized access event from occurring at ATM 2 or ATM 3.

Process flow 450 may include additional embodiments, such as any single embodiment or any combination of embodiments described below and/or in connection with one or more other processes described elsewhere herein. Although FIG. 4B shows example blocks of process flow 450, in some embodiments, process flow 450 may include additional blocks, fewer blocks, different blocks, or differently arranged blocks than those depicted in FIG. 4B. Additionally, or alternatively, two or more of the blocks of process flow 450 may be performed in parallel.

FIG. 5 illustrates a process flow 500 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 500.

As shown in FIG. 5, the process flow 500 may include training, with videos, one or more AIVRs to identify potential unauthorized access events at one or more ATMs. For example, an unauthorized access prediction system and ATM, one or more network nodes, and/or the like may provide the videos to the AIVRs.

As shown in FIG. 5, the process flow 500 may include performing live video monitoring using the AIVR. For example, the AIVR may perform live video monitoring of an ATM and/or an area proximate and/or surrounding an ATM. In some embodiments, and as shown in FIG. 5, the process flow 500 may include performing real time image analysis using deep learning techniques, such as a convolutional neural network (CNN), a recurrent neural network (RNN), and/or the like.

As shown in FIG. 5, the process flow 500 may include predicting a next movement of a user at the ATM based on an algorithm, such as the Kalman Filter, a fast region based convolution neural network (Fast R-CNN), and/or the like. For example, the AIVR may predict a next movement of a user and may determine whether the next predicted movement is associated with an unauthorized access event.

As shown in FIG. 5, the process flow 500 may include sending, via a 5G network, an alert to a central server/cloud based on predicting an unauthorized access event at the ATM. For example, the ATM and/or the AIVR may be communicatively connected to a 5G cellular network, and the ATM and/or the AIVR may send an alert via the 5G cellular network.

Process flow 500 may include additional embodiments, such as any single embodiment or any combination of embodiments described below and/or in connection with one or more other processes described elsewhere herein. Although FIG. 5 shows example blocks of process flow 500, in some embodiments, process flow 500 may include additional blocks, fewer blocks, different blocks, or differently arranged blocks than those depicted in FIG. 5. Additionally, or alternatively, two or more of the blocks of process flow 500 may be performed in parallel.

FIG. 6 illustrates a system environment 600 for predicting, detecting, and preventing unauthorized access events associated with electronic systems, in accordance with an embodiment of the invention. As shown in FIG. 6, the system environment 600 may include a plurality of AIVRs (e.g., associated with one or more ATMs), a 5G network, and a central server. In some embodiments, and as shown in FIG. 6, the AIVRs may be communicatively connected to the central server via the 5G network.

The embodiment of the system environment 600 illustrated in FIG. 6 is exemplary and other embodiments may vary. As another example, in some embodiments, the system environment 600 includes more, less, or different components. As another example, in some embodiments, some or all of the portions of the system environment 600, the AIVRs, the 5G network, and/or the central server may be combined into a single portion. Likewise, in some embodiments, some or all of the portions of the system environment 600, the AIVRs, the 5G network, and/or the central server may be separated into two or more distinct portions.

FIG. 7 illustrates a map 700 associated with a system for predicting, detecting, and preventing unauthorized access events associated with electronic systems, in accordance with an embodiment of the invention. As shown in FIG. 7, the map 700 identifies the locations of fourteen different ATMs. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may receive alert messages from and provide alert messages and/or commands to the fourteen ATMs on the map 700 to predict, detect, and prevent unauthorized access events at the fourteen ATMs.

For example, if ATM 1 detects and/or predicts an unauthorized access event and generates an alert message, a system for predicting, detecting, and preventing unauthorized access events may receive the alert message, determine a location of ATM 1, identify that ATM 2, ATM 3, ATM 4, and ATM 5 are proximate the location of ATM 1, and provide, to ATM 2, ATM 3, ATM 4, and ATM 5, one or more commands to be executed by to prevent another unauthorized access event from occurring at ATM 2, ATM 3, ATM 4, or ATM 5. In some embodiments, the system for predicting, detecting, and preventing unauthorized access events may determine that ATM 6, ATM 7, ATM 8, ATM 9, ATM 10, ATM 11, ATM 12, ATM 13, and ATM 14 are not proximate the location of ATM 1 and, therefore, may not provide commands to those ATMs. Stated differently, in some embodiments, the system for predicting, detecting, and preventing unauthorized access events may only provide commands to ATMs proximate the location of an ATM at which an unauthorized access event has been predicted and/or has occurred.

FIG. 8 illustrates a map 800 associated with a system for predicting, detecting, and preventing unauthorized access events associated with electronic systems, in accordance with an embodiment of the invention. As shown in FIG. 8, the map 800 identifies the locations of fourteen different ATMs. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may receive alert messages from and provide alert messages and/or commands to the fourteen ATMs on the map 800 to predict, detect, and prevent unauthorized access events at the fourteen ATMs.

In some embodiments, if ATM 1 detects and/or predicts an unauthorized access event and generates an alert message, a system for predicting, detecting, and preventing unauthorized access events may receive the alert message, receive, from a GPS receiver module of ATM 1, location-identifying information, determine whether ATM 1 has been removed from its original location, determine an expected route of ATM 1, identify other ATMs proximate the expected route, provide commands to the other ATMs to be executed by the other ATMs to prevent additional unauthorized access events from occurring, provide the location-identifying information and/or the expected route of ATM 1 to a law enforcement system, and/or the like. For example, and as shown in FIG. 8, the system for predicting, detecting, and preventing unauthorized access events may determine an expected route of ATM 1, determine that ATM 4, ATM 10, and ATM 12 are proximate the expected route, and provide commands to ATM 4, ATM 10, and ATM 12 to be executed by ATM 4, ATM 10, and ATM 12 to prevent additional unauthorized access events from occurring.

In some embodiments, the system for predicting, detecting, and preventing unauthorized access events may determine that ATM 2, ATM 3, ATM 5, ATM 6, ATM 7, ATM 8, ATM 9, ATM 11, ATM 13, and ATM 14 are not proximate the expected route and, therefore, may not provide commands to those ATMs. Stated differently, in some embodiments, the system for predicting, detecting, and preventing unauthorized access events may only provide commands to ATMs proximate the expected route an ATM at which an unauthorized access event has been predicted and/or has occurred.

Additionally, or alternatively, the system for predicting, detecting, and preventing unauthorized access events may provide commands to ATMs proximate the location of an ATM at which an unauthorized access event has been predicted and/or has occurred, as described herein with respect to FIG. 7, and also provide commands to ATMs proximate the expected route an ATM at which an unauthorized access event has been predicted and/or has occurred, as described herein with respect to FIG. 8. For example, if ATM 1 detects and/or predicts an unauthorized access event and generates an alert message, the system may provide commands to be executed by ATM 2, ATM 3, ATM 4, ATM 5, ATM 10, and ATM 12 to prevent additional unauthorized access events from occurring.

In some embodiments, the system may provide commands to be executed by other ATMs proximate an ATM at which an unauthorized access event has been predicted and/or has occurred as the ATM travels along an expected route. For example, if ATM 1 detects and/or predicts an unauthorized access event and generates an alert message, the system may, as ATM 1 travels along the expected route, provide commands to be executed by ATM 11, ATM 13, and ATM 14 to prevent additional unauthorized access events from occurring (e.g., even though ATM 11, ATM 13, and ATM 14 are not along the expected route. In this way, the system may prevent additional unauthorized access events from occurring if ATM 1 changes direction as compared to the expected route.

FIG. 9 illustrates a process flow 900 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 900.

As shown in FIG. 9, the process flow 900 may include ATM A, ATM B, ATM C, ATM D, and ATM E communicatively connected to each other by a 5G backhaul network. For example, the ATMs (i.e., ATM A, ATM B, ATM C, ATM D, and ATM E) may have peer-to-peer connectivity via the 5G backhaul network. In some embodiments, the ATMs may each include an AIVR for detecting, at the edge of the 5G backhaul network, user behavior associated with unauthorized access events.

As shown in FIG. 9, the process flow 900 may include predicting and/or detecting an unauthorized access event at ATM A. In some embodiments, and as shown in FIG. 9, ATM A, ATM B, and ATM C may be automatedly geofenced to prevent additional unauthorized access events. For example, the process flow 900 may include providing, based on predicting and/or detecting an unauthorized access event at ATM A, one or more commands to be executed by ATM B and ATM C to prevent additional unauthorized access events.

In some embodiments, the process flow 900 may include transmitting, via the 5G backhaul network, high fidelity images and/or video of user behavior associated with unauthorized access events. Additionally, or alternatively, the process flow 900 may include the ATMs comparing the high fidelity images and/or video of user behavior associated with unauthorized access events to real time images and/or video of real time user behavior to determine whether the real time user behavior is associated with unauthorized access events.

In some embodiments, the process flow 900 may include generating, via the 5G backhaul network, composite images and/or synopses of users associated with unauthorized access events. Additionally, or alternatively, the process flow 900 may include determining preventative actions based on data and/or information shared between the ATMs via the 5G backhaul network. In some embodiments, the process flow 900 may include detecting future unauthorized access events based on data and/or information shared between the ATMs via the 5G backhaul network.

In some embodiments, the process flow 900 may include performing predictive analysis on the edge of the 5G backhaul network to identify an expected route of a user associated with the unauthorized access event. Additionally, or alternatively, the process flow 900 may include analyzing data and/or information shared between the ATMs via the 5G backhaul network to determine and/or detect future unauthorized access events based on manufacturers of ATMs, financial institutions associated with ATMs, layouts of ATMs, and/or the like.

Process flow 900 may include additional embodiments, such as any single embodiment or any combination of embodiments described below and/or in connection with one or more other processes described elsewhere herein. Although FIG. 9 shows example blocks of process flow 900, in some embodiments, process flow 900 may include additional blocks, fewer blocks, different blocks, or differently arranged blocks than those depicted in FIG. 9. Additionally, or alternatively, two or more of the blocks of process flow 900 may be performed in parallel.

FIG. 10 illustrates a process flow 1000 for predicting, detecting, and preventing unauthorized access events associated with electronic systems, in accordance with an embodiment of the invention. In some embodiments, one or more automated teller machines, one or more unauthorized access prediction systems, one or more broadcasting systems, one or more central servers, one or more artificial-intelligence-enabled vision enabled robots, and/or one or more network nodes, and/or the like (e.g., similar to one or more of the systems described herein with respect to FIG. 1) may perform one or more of the steps of process flow 1000.

As shown in block 1002, the process flow 1000 may include receiving, from a first automated teller machine, an alert message including information associated with a first unauthorized access event occurring at the first automated teller machine. For example, another automated teller machine, an unauthorized access prediction system, a broadcasting system, a central server, an artificial-intelligence-enabled vision enabled robot, a network node, and/or the like may receive, from a first automated teller machine, an alert message including information associated with a first unauthorized access event occurring at the first automated teller machine.

As shown in block 1004, the process flow 1000 may include determining, based on the information in the alert message, a location of the first automated teller machine. For example, another automated teller machine, an unauthorized access prediction system, a broadcasting system, a central server, an artificial-intelligence-enabled vision enabled robot, a network node, and/or the like may determine, based on the information in the alert message, a location of the first automated teller machine.

As shown in block 1006, the process flow 1000 may include identifying a second automated teller machine proximate the location of the first automated teller machine. For example, another automated teller machine, an unauthorized access prediction system, a broadcasting system, a central server, an artificial-intelligence-enabled vision enabled robot, a network node, and/or the like may identify a second automated teller machine proximate the location of the first automated teller machine.

As shown in block 1008, the process flow 1000 may include providing, to the second automated teller machine, one or more commands to be executed by the second automated teller machine to prevent a second unauthorized access event from occurring at the second automated teller machine. For example, another automated teller machine, an unauthorized access prediction system, a broadcasting system, a central server, an artificial-intelligence-enabled vision enabled robot, a network node, and/or the like may provide, to the second automated teller machine, one or more commands to be executed by the second automated teller machine to prevent a second unauthorized access event from occurring at the second automated teller machine.

Process flow 1000 may include additional embodiments, such as any single embodiment or any combination of embodiments described below and/or in connection with one or more other processes described elsewhere herein.

In a first embodiment, the first automated teller machine may be configured to provide the alert message via a wireless network, the process flow 1000 may include receiving the alert message from the first automated teller machine via the wireless network and providing the one or more commands to the second automated teller machine via the wireless network, and the second automated teller machine may be configured to receive the one or more commands via the wireless network.

In a second embodiment alone or in combination with the first embodiment, the wireless network may be a 5G cellular network.

In a third embodiment alone or in combination with any of the first through second embodiments, the location may be a first location and the process flow 1000 may include receiving, from a Global Positioning System (GPS) receiver module of the first automated teller machine, location-identifying information and determining, based on the location-identifying information, whether the first automated teller machine was removed from the first location.

In a fourth embodiment alone or in combination with any of the first through third embodiments, the process flow 1000 may include, based on determining that the first automated teller machine was removed from the first location, providing the location-identifying information to a law enforcement system, determining, based on the location-identifying information, an expected route of the first automated teller machine, identifying other automated teller machines proximate the expected route, providing, to the other automated teller machines, additional commands to be executed by the other automated teller machines to prevent additional unauthorized access events from occurring at the other automated teller machines, and/or the like.

In a fifth embodiment alone or in combination with any of the first through fourth embodiments, the first automated teller machine may be associated with a first financial institution, and the second automated teller machine may be associated with a second financial institution.

In a sixth embodiment alone or in combination with any of the first through fifth embodiments, the one or more commands may include a command to shut a door, a command to disable a currency dispenser, a command to disable the second automated teller machine, a command to capture images with image capturing devices of the second automated teller machine, and/or the like.

In a seventh embodiment alone or in combination with any of the first through sixth embodiments, the first automated teller machine may include an image capturing device for capturing images of objects proximate the first automated teller machine and another processing device, where the other processing device is configured to analyze, using a machine learning model, the images captured by the image capturing device to determine whether the first unauthorized access event is occurring and provide, based on determining that the first unauthorized access event is occurring, the alert message.

In an eighth embodiment alone or in combination with any of the first through seventh embodiments, the other processing device may be configured to, when analyzing the images captured by the image capturing device, analyze, using the machine learning model, the images captured by the image capturing device to determine whether behavior of a user proximate the first automated teller machine is associated with unauthorized access events.

In a ninth embodiment alone or in combination with any of the first through eighth embodiments, the machine learning model may be trained using historical image data associated with unauthorized access events and historical image data associated with authorized access events.

In a tenth embodiment alone or in combination with any of the first through ninth embodiments, the first automated teller machine may include multiple image capturing devices for capturing images of the objects proximate the first automated teller machine, and the other processing device may be configured to analyze, using the machine learning model, the images captured by the multiple image capturing devices to determine whether the first unauthorized access event is occurring.

In an eleventh embodiment alone or in combination with any of the first through tenth embodiments, the machine learning model may include a convolutional neural network and a recurrent neural network.

In a twelfth embodiment alone or in combination with any of the first through eleventh embodiments, the first automated teller machine may include an image capturing device for capturing images of objects proximate the first automated teller machine and another processing device, where the other processing device is configured to analyze, using a machine learning model, the images captured by the image capturing device to predict the first unauthorized access event and provide, based on predicting the first unauthorized access event, the alert message.

In a thirteenth embodiment alone or in combination with any of the first through twelfth embodiments, the machine learning model may include a convolutional neural network and a recurrent neural network, and the other processing device may be configured to, when analyzing the images captured by the image capturing device to predict the first unauthorized access event, analyze, using the convolutional neural network and the recurrent neural network, the images captured by the image capturing device and determine, using a fast region-based convolutional neural network, a Kalman Filter, and/or the like, a predicted next action of a user proximate the first automated teller machine.

In a fourteenth embodiment alone or in combination with any of the first through thirteenth embodiments, the first automated teller machine may include another processing device, where the other processing device is configured to identify a third automated teller machine proximate the location of the first automated teller machine and provide, to the third automated teller machine via a 5G cellular network, another alert message including the information associated with the first unauthorized access event.

In a fifteenth embodiment alone or in combination with any of the first through fourteenth embodiments, the first automated teller machine may include an image capturing device for capturing images of objects proximate the first automated teller machine, and the other processing device may be configured to, when providing the other alert message to the third automated teller machine, provide images captured, with the image capturing device, during a time period associated with the first unauthorized access event.

In a sixteenth embodiment alone or in combination with any of the first through fifteenth embodiments, the first automated teller machine and the second automated teller machine may be connected to a 5G cellular network, where the 5G cellular network includes one or more nodes, and where the first automated teller machine, the second automated teller machine, and the one or more nodes each includes another processor configured to communicate information associated with unauthorized access events via the 5G cellular network, determine, based on the information associated with the unauthorized access events communicated via the 5G cellular network, expected routes of users associated with the unauthorized access events, determine, based on the information associated with the unauthorized access events communicated via the 5G cellular network, other automated teller machines associated with a likelihood of other unauthorized access events, and provide, to the other automated teller machines via the 5G cellular network, additional commands to be executed by the other automated teller machines to prevent additional unauthorized access events from occurring at the other automated teller machines.

Although FIG. 10 shows example blocks of process flow 1000, in some embodiments, process flow 1000 may include additional blocks, fewer blocks, different blocks, or differently arranged blocks than those depicted in FIG. 10. Additionally, or alternatively, two or more of the blocks of process flow 1000 may be performed in parallel.

As noted above, in some embodiments, the process flows described herein may include performing one or more of the functions described herein using artificial intelligence, machine learning, and/or a machine learning model. For example, the system may provide videos of user behavior, images of user behavior, and/or user interactions with a user input device to a machine learning model trained (e.g., using historical videos of user behavior, historical images of user behavior, and/or historical user interactions with a user input device) to output determinations of whether user behavior is associated with unauthorized access events, whether an unauthorized access event is likely to occur, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on historical data associated with videos of user behavior, images of user behavior, user interactions with a user input device, and/or the like over a predetermined past period of time. In doing so, the system may be configured to generate determinations of whether user behavior is associated with unauthorized access events, whether an unauthorized access event is likely to occur, and/or the like. In some embodiments, the one or more machine learning algorithms may be used to calculate likelihoods, and whether the likelihoods satisfy a threshold. Additionally, or alternatively, the system may continuously re-train the machine learning model using a quantum computing engine, videos of user behavior, images of user behavior, and user interactions with a user input device.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for predicting, detecting, and preventing unauthorized access events associated with electronic systems, the system comprising:
   at least one processing device; and
   at least one non-transitory storage device containing instructions that, when executed by the at least one processing device, cause the at least one processing device to:
      receive, from a first automated teller machine, an alert message comprising information associated with a first unauthorized access event occurring at the first automated teller machine;
      determine, based on the information in the alert message, a location of the first automated teller machine;
      determine, based on the location of the first automated teller machine, an expected route that would be used by a user associated with the unauthorized access event;
      identify at least one second automated teller machine proximate the expected route; and
      provide, to the at least one second automated teller machine, one or more commands to be executed by the second automated teller machine to prevent a second unauthorized access event from occurring at the at least one second automated teller machine.

2. The system of claim 1, wherein:
   the first automated teller machine is configured to provide the alert message via a wireless network;
   the at least one non-transitory storage device further comprises instructions that, when executed by the at least one processing device, cause the at least one processing device to:
      receive the alert message from the first automated teller machine via the wireless network; and
      provide the one or more commands to the at least one second automated teller machine via the wireless network; and
   the at least one second automated teller machine is configured to receive the one or more commands via the wireless network.

3. The system of claim 2, wherein the wireless network is a 5G cellular network.

4. The system of claim 1, wherein the location is a first location, and wherein the at least one non-transitory storage device further comprises instructions that, when executed by the at least one processing device, cause the at least one processing device to:
   receive, from a Global Positioning System (GPS) receiver module of the first automated teller machine, location-identifying information; and
   determine, based on the location-identifying information, whether the first automated teller machine was removed from the first location.

5. The system of claim 4, wherein based on determining that the first automated teller machine was removed from the first location, the at least one non-transitory storage device further comprises instructions that, when executed by the at least one processing device, cause the at least one processing device to:
  determine, based on the location-identifying information from the GPS, the expected route that would be used by a user associated with the unauthorized access event;
  identify additional second automated teller machines proximate the expected route; and
  provide, to the additional second automated teller machines, commands to be executed by the additional second automated teller machines to prevent additional unauthorized access events from occurring at the additional second automated teller machines.

6. The system of claim 1, wherein the first automated teller machine is associated with a first financial institution, and wherein the at least one second automated teller machine is associated with a second financial institution.

7. The system of claim 1, wherein the one or more commands comprise at least one of a command to shut a door, a command to disable a currency dispenser, a command to disable the second automated teller machine, and/or a command to capture images with image capturing devices of the second automated teller machine.

8. The system of claim 1, wherein the first automated teller machine comprises:
  an image capturing device for capturing images of objects proximate the first automated teller machine; and
  a second processing device, wherein the second processing device is configured to, based on operation of instructions stored in a second non-transitory storage device:
    analyze, using a machine learning model, the images captured by the image capturing device to determine whether the first unauthorized access event is occurring; and
    provide, based on determining that the first unauthorized access event is occurring, the alert message.

9. The system of claim 8, wherein the second processing device is configured to, based on operation of instructions stored in the second non-transitory storage device, when analyzing the images captured by the image capturing device, analyze, using the machine learning model, the images captured by the image capturing device to determine whether behavior of a user proximate the first automated teller machine is associated with unauthorized access events.

10. The system of claim 8, wherein the machine learning model is trained using historical image data associated with unauthorized access events and historical image data associated with authorized access events.

11. The system of claim 8, wherein the first automated teller machine comprises multiple image capturing devices for capturing images of the objects proximate the first automated teller machine, and wherein the second processing device is configured to, based on operation of instructions stored in the second non-transitory storage device, analyze, using the machine learning model, the images captured by the multiple image capturing devices to determine whether the first unauthorized access event is occurring.

12. The system of claim 8, wherein the machine learning model comprises a convolutional neural network and a recurrent neural network.

13. The system of claim 1, wherein the first automated teller machine comprises:
  an image capturing device for capturing images of objects proximate the first automated teller machine; and
  a second processing device, wherein the second processing device is configured to, based on operation of instructions stored in a second non-transitory storage device:
    analyze, using a machine learning model, the images captured by the image capturing device to predict the first unauthorized access event; and
    provide, based on predicting the first unauthorized access event, the alert message.

14. The system of claim 13, wherein the machine learning model comprises a convolutional neural network and a recurrent neural network, and wherein the second processing device is configured to, based on operation of instructions stored in the second non-transitory storage device, when analyzing the images captured by the image capturing device to predict the first unauthorized access event:
  analyze, using the convolutional neural network and the recurrent neural network, the images captured by the image capturing device; and
  determine, using at least one of a fast region-based convolutional neural network or a Kalman Filter, a predicted next action of a user proximate the first automated teller machine.

15. The system of claim 1, wherein the first automated teller machine comprises a second processing device, wherein the second processing device is configured to, based on operation of instructions stored in the second non-transitory storage device:
  identify a third automated teller machine proximate the location of the first automated teller machine; and
  provide, to the third automated teller machine via a 5G cellular network, another alert message comprising the information associated with the first unauthorized access event.

16. The system of claim 15, wherein the first automated teller machine comprises an image capturing device for capturing images of objects proximate the first automated teller machine, and wherein the second processing device is configured to, based on operation of instructions stored in the second non-transitory storage device, when providing the other alert message to the third automated teller machine, provide images captured, with the image capturing device, during a time period associated with the first unauthorized access event.

17. The system of claim 1, wherein the first automated teller machine and the at least one second automated teller machine are connected to a 5G cellular network, wherein the 5G cellular network comprises one or more nodes, and wherein the first automated teller machine, the at least one second automated teller machine, and the one or more nodes each comprise second processors configured to, based on operation of instructions stored in associated non-transitory storage devices:
  communicate information associated with unauthorized access events via the 5G cellular network;
  determine, based on the information associated with the unauthorized access events communicated via the 5G cellular network, expected routes of users associated with the unauthorized access events;
  determine, based on the information associated with the unauthorized access events communicated via the 5G cellular network, other automated teller machines associated with a likelihood of other unauthorized access events; and
  provide, to the other automated teller machines via the 5G cellular network, additional commands to be executed by the other automated teller machines to prevent additional unauthorized access events from occurring at the other automated teller machines.

18. A computer program product for predicting, detecting, and preventing unauthorized access events associated with electronic systems, the computer program product comprising a non-transitory computer-readable medium comprising code causing a first apparatus to:
receive, from a first automated teller machine, an alert message comprising information associated with a first unauthorized access event occurring at the first automated teller machine;
determine, based on the information in the alert message, a location of the first automated teller machine;
determine, based on the location of the first automated teller machine, an expected route that would be used by a user associated with the unauthorized access event;
identify at least one second automated teller machine proximate the expected route; and
provide, to the at least one second automated teller machine, one or more commands to be executed by the second automated teller machine to prevent a second unauthorized access event from occurring at the at least one second automated teller machine.

19. The computer program product of claim 18, wherein:
the first automated teller machine is configured to provide the alert message via a wireless network; and
wherein the non-transitory computer-readable medium comprises code causing the first apparatus to:
receive the alert message from the first automated teller machine via the wireless network; and
provide the one or more commands to the at least one second automated teller machine via the wireless network; and
the at least one second automated teller machine is configured to receive the one or more commands via the wireless network.

20. A method for predicting, detecting, and preventing unauthorized access events associated with electronic systems, the method comprising:
receiving, from a first automated teller machine, an alert message comprising information associated with a first unauthorized access event occurring at the first automated teller machine;
determining, based on the information in the alert message, a location of the first automated teller machine;
determining, based on the location of the first automated teller machine, an expected route that would be used by a user associated with the unauthorized access event;
identifying at least one second automated teller machine proximate the expected route; and
providing, to the at least one second automated teller machine, one or more commands to be executed by the second automated teller machine to prevent a second unauthorized access event from occurring at the at least one second automated teller machine.

* * * * *